Feb. 22, 1944.   J. B. LITTLE ET AL   2,342,412
ELECTRON DISCHARGE DEVICE
Filed Aug. 28, 1941   5 Sheets-Sheet 1

INVENTORS J. B. LITTLE
V. L. RONCI
BY
Walter C. Kiesel
ATTORNEY

Feb. 22, 1944.                J. B. LITTLE ET AL                2,342,412
                              ELECTRON DISCHARGE DEVICE
                          Filed Aug. 28, 1941         5 Sheets-Sheet 3

FIG. 4

INVENTORS  J. B. LITTLE
           V. L. RONCI
BY
           Walter E. Kiesel
                ATTORNEY Feb. 22, 1944.    J. B. LITTLE ET AL    2,342,412
ELECTRON DISCHARGE DEVICE
Filed Aug. 28, 1941    5 Sheets-Sheet 4

INVENTORS  J. B. LITTLE
V. L. RONCI
BY
Walter C. Kiesel
ATTORNEY

Patented Feb. 22, 1944

2,342,412

UNITED STATES PATENT OFFICE 2,342,412

ELECTRON DISCHARGE DEVICE

John B. Little, New York, and Victor L. Ronci, Brooklyn, N. Y., assignors to Bell Telephone Laboratories, Incorporated, New York, N. Y., a corporation of New York Application August 28, 1941, Serial No. 408,606

18 Claims. (Cl. 250—27.5)

This invention relates to electron discharge devices and more particularly to high power output devices in which a cooling medium is circulated to dissipate the heat generated during operation.

An object of the invention is to eliminate extraneous auxiliary equipment heretofore necessary for the efficient dissipation of thermal energy in the operation of the high power discharge device.

Another object of the invention is to provide a compact self-contained unit, easily handled, highly efficient and having a high safety factor.

A further object of the invention is to increase the dissipation of thermal energy by a continuous circulatory closed system of cooling medium formed as an integral part of the discharge device.

Another object of the invention is to compensate for expansion of the heat exchanging medium to prevent loss during operation.

These objects are attained in accordance with one aspect of the invention in a portable unit comprising an external anode discharge device, an enclosing jacket surrounding the anode of the device for circulating a cooling liquid in close contact with the anode to dissipate heat energy, and a closed heat exchanger passageway connected to the inlet and outlet ports of the jacket. The passageway may be a plurality of turns of hollow tubing forming a radiator in which a cooling medium is continuously recirculated through the jacket by an impeller pump located between the radiator and the inlet of the jacket. An expansion chamber may also be provided adjacent the outlet of the jacket to compensate for differences of pressure flow of the cooling fluid through the system.

A feature of this construction relates to the mounting of the device and jacket on a platform which also supports the pump enclosure, the radiator being suspended below the platform so that the device, jacket, pump and radiator form a compact unit. This arrangement facilitates the disposition of the unit in an air duct in which the radiator is exposed to a continuous blast of forced air to lower the temperature of fluid circulated therein. The platform therefore acts as a closure for the air duct and rigidly supports the device in a convenient position for cooperation with other associated devices and operating apparatus.

Another feature of the invention relates to the safety factors of the construction in which the motor shaft or the impeller pump and the air duct are insulated from the high potential of the anode of the discharge device to protect the operator against injury when necessity requires contact with these parts of the installation. This arrangement provides an insulated section of shafting between the driving motor and the pump housing and an insulating ring or collar support for the reception of the unit in the air duct.

Another feature of the invention is concerned with the assembly of the device in which the radiator is formed integral with a section of the air duct so that the unit may be interposed between adjacent communicating duct sections or several units may be arranged in series relation to form an elongated duct passageway. In this arrangement parallel radiator members are mounted in vertical relation in a box section of a casing having open sides, the radiator members being connected in series by elbow joints to form a continuous cooling passageway for the fluid.

Another feature relates to the construction of the jacket, expansion chamber and impeller pump as a unit assembly centrally disposed with respect to the radiator assembly and in which the jacket is removably attached to the unit. In this arrangement the expansion chamber surrounds the jacket and the coupling of the jacket is nested below the expansion chamber to decrease the overall length of the device above the duct.

These and other features of the invention will be more clearly understood by reference to the following detailed specification taken in connection with the accompanying drawings.

Figure 1:
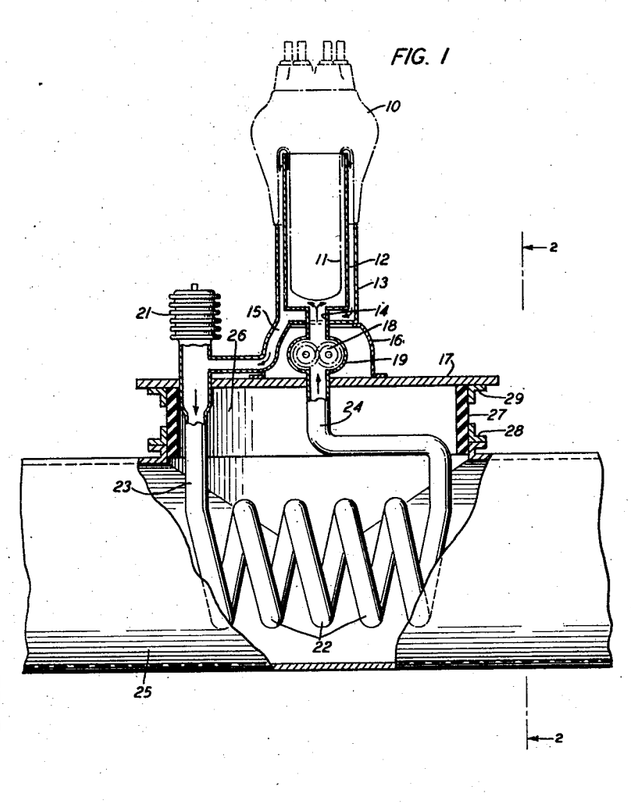
Fig. 1 illustrates one complete form of the invention, partly shown in cross-section, and partly broken away, to show the essential elements of the structure.
Figure 2:
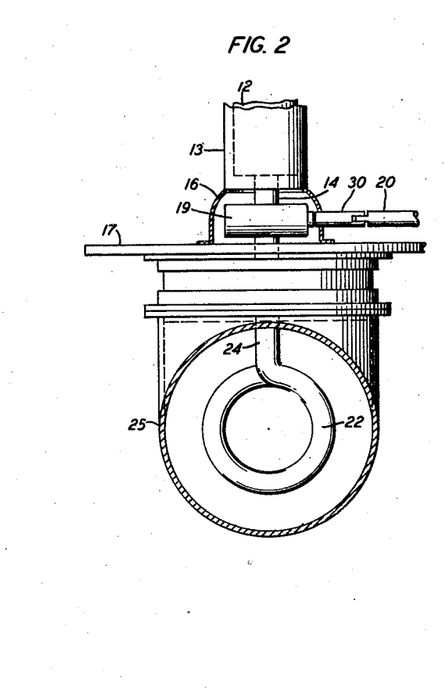
Fig. 2 is a side view of Fig. 1 illustrating the relation of the parts of the structure with respect to each other.

Referring now to the drawings and particularly to Figs. 1 and 2, the unitary assembly of this invention is disclosed in connection with a high power electron discharge device having a bulbous glass portion 10 provided with the usual seals and terminals for the internal elements of the device and an external hollow anode portion 11 having a double-walled section within the glass portion to decrease the over-all length of the device and the anode being surrounded by a pair of coaxial metallic wall members 12 and 13 which form a cooling jacket around the anode, the outer wall member being integrally secured to the discharge device to form a single unit. A typical structure of the device is disclosed in U. S. Patent No. 2,317,222, issued April 20, 1943, to V. L. Ronci. However, this invention is not limited to the specific structure of the discharge device or even to an external anode discharge device with an integral water jacket since any other type of external anode discharge device may be employed with or without the water jacket integral therewith.

The jacket as shown in Fig. 1 is provided with an inlet port 14 extending downwardly through the center of the jacket and an outlet port 15 communicating with a chamber between the wall portions 12 and 13 so that a cooling fluid may be circulated around the anode 11 and discharged from the jacket through the outlet port 15. The jacket and tube structure are mounted on a hollow housing 16 which is supported by a platform of plate closure 17. The housing 16 contains a rotary impeller pump 18 contained in an enlarged casing 19 of the inlet port 14 of the jacket, the pump being actuated by a motive force connected to shaft 20. The outlet port 15 is in communication with an expansion chamber 21 mounted above the platform 17 and a heat exchanger or radiator is mounted below the platform 17, the radiator being formed of a plurality of helical tubular sections 22 with one end 23 joined to the outlet port and expansion chamber, while the other end 24 is connected to the pump casing 19. The radiator is formed of thin walled copper tubing, to readily dissipate the heat and if desirable the radiator tubing may be provided with suitable fins to increase the dissipation of heat therefrom. The radiator sections may be filled with a non-evaporating cooling medium or refrigerant, such as "Prestone," which is a commercial composition containing ethylene glycol. The impeller pump 18 circulates the cooling liquid or medium through the inlet port and around the anode 11 to carry away the heat from the anode which is at high potential and the circulating liquid enters the outer chamber of the jacket through the outlet port 15 and the expansion chamber 21 and is then returned to the radiator through the tubular conduit 23.

The compact assembly of the self-contained cooling system for the electron discharge device materially simplifies the installation and maintenance of such equipment since the unit may be easily handled by a single operator for mounting or replacement and materially reduces the installation and maintenance costs. Furthermore, the closed recirculating system of the device eliminates long cooling columns, special cooling liquid supply, special extraneous safety equipment and spray pools exterior to the building in which the equipment is used for aerating and dissipating the heat energy of the fluid.

The compact unit of this invention is adapted to be mounted in a suitable opening of an air duct casing 25 in which a draft of air is forced around the radiator sections mounted in the duct to carry away the heat of the cooling fluid passing through the radiator. As shown in Fig. 1, the discharge device, jacket, pump and expansion chamber are mounted above the duct while the radiator is mounted within the duct and the platform 17 forms a closure for a chimney opening 26 of the duct casing. The heat generated by the anode 11 is efficiently dissipated in the closed system of this invention by the continuous circulation of the cooling fluid through the jacket and radiator by the pump 18 and the heat energy is dissipated through the walls of the radiator sections or the fins thereon which are maintained at a low temperature by the continuous forced draft of air passing through the duct casing 25.

Since the discharge device adapted for use in this invention has an operating output of 10 kilowatts or more, the anode and the associated parts thereof including the jacket and the radiator are maintained at a high potential, of the order of 10,000 volts or more, to attain the high power output efficiency from the device. Since the pump and radiator are fully enclosed by the housing 16 and the air duct 25, respectively, there is no danger or injury to an operator or attendant by contact with these elements during the operation of the device when the high potential is applied to the anode. However, since the platform is in contact with the chimney portion of the duct casing, it is essential to insulate the duct casing from the discharge unit in order to protect the operator against injury if it becomes necessary to perform maintenance duties on the duct casing or the equipment associated therewith. This is accomplished by electrically separating the discharge device unit from the duct by an insulating sleeve or collar 27 which is attached to the chimney opening by a flanged ring 28 and a similar flanged ring 29 at the top of the collar forms a seat or base for the platform 17. The motor equipment is likewise electrically isolated from the pump by an intermediate insulated shaft 30 having one end easily disconnected from the motor shaft 20 when the unit is to be removed from the duct casing. Another safety factor achieved by this invention is the relationship of the radiator coil with respect to the duct casing to nullify the electric field set up by the coiled radiator which is equivalent to a charged inductance winding. As shown in Fig. 2, the air space impedance surrounding the coil between the coil and the duct casing 25 and the space within the coil is equalized or made uniform to annul the effect of the electric field on the duct casing so that the casing is at zero potential regardless of the potential of the coil or radiator.

Figure 3:
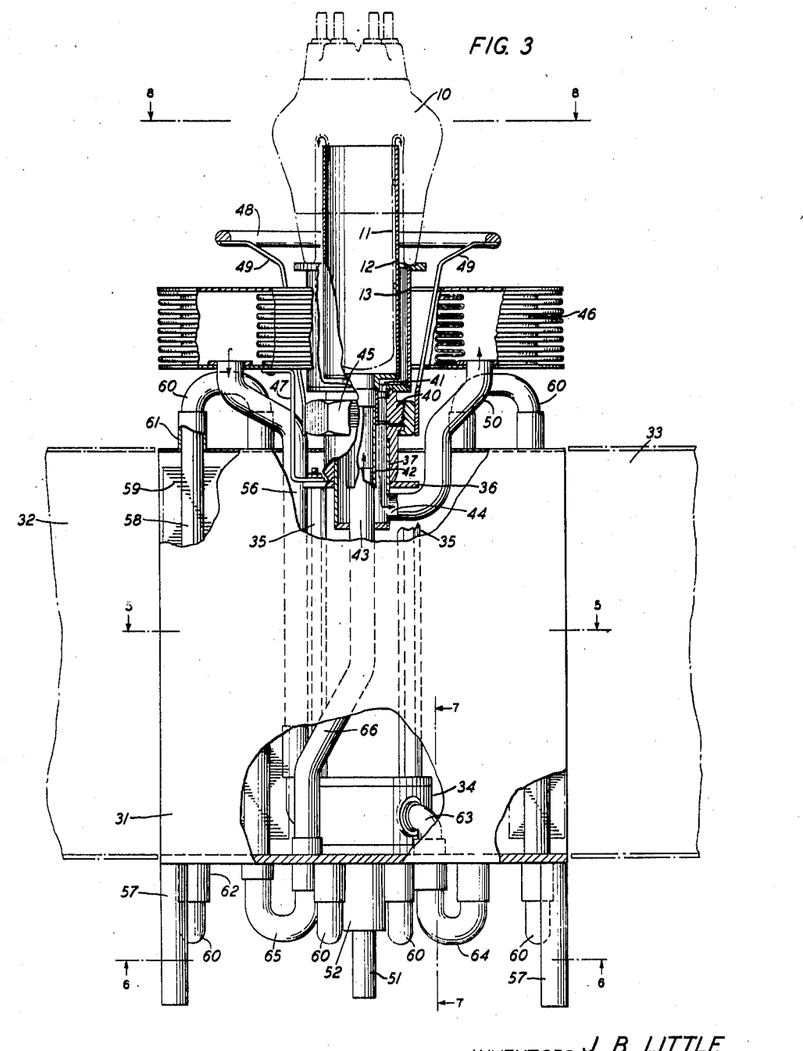
Fig. 3 illustrates another complete form of the invention with parts shown in cross-section and other parts broken away to clearly show details of the assembly.
Figure 4:
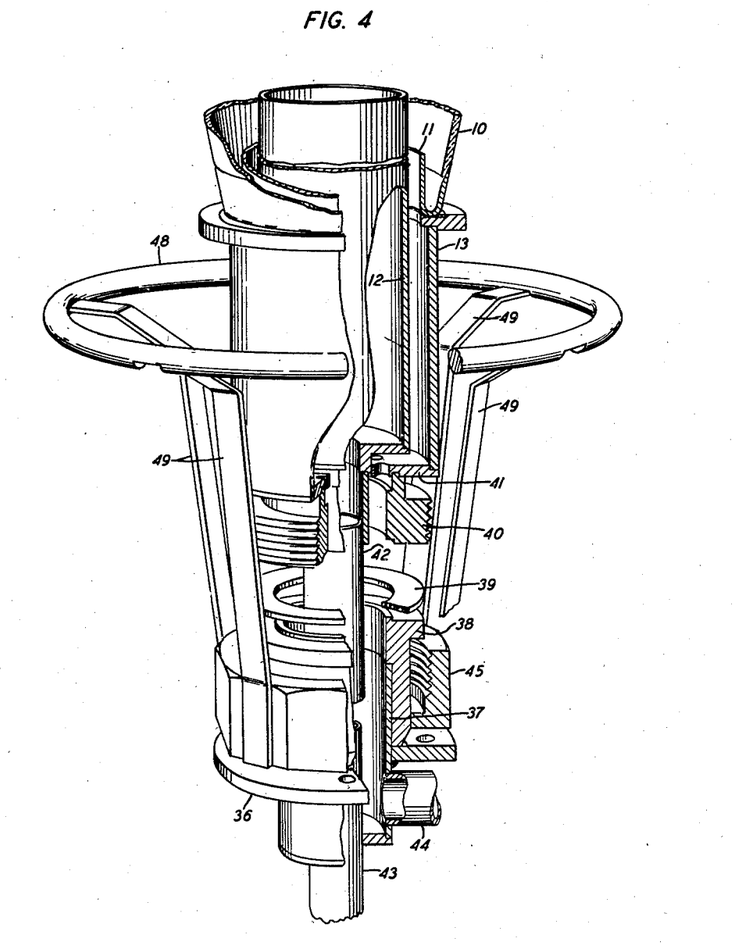
Fig. 4 is an enlarged perspective view of the coupling assembly between the jacket and radiator with part shown in cross-section to illustrate the detailed construction.

A more advanced form of the invention is disclosed in Fig. 3 in which the discharge device is centrally mounted in the unit assembly and the duct casing forms an integral section of the unit. In this arrangement the discharge device is removably attached to the unit for replacement if failure occurs and the device is nested in the center of the expansion chamber to reduce the over-all length of the unit. Furthermore, this construction provides for the ready removal of the impeller pump and expansion chamber as a separate unit from the casing to facilitate inspection or repairs without disturbing the remainder of the installed unit. In this arrangement the air duct is formed of a rectangular or box-shaped casing 31 having opposite side openings to communicate with duct sections 32 and 33 on opposite sides thereof, or if desired, several units, made in accordance with this invention, may be arranged in series with their open sides in abutting relation and associated with a suitable duct casing. An impeller pump 34 is mounted centrally in the bottom of the duct casing 31 and is attached to the casing by suitable bolts extending from the bottom of the casing. The pump housing supports a plurality of upright rods 35 which extend toward the top of the casing to support a heavy metallic ring 36 for a hollow receptacle 37, the rods 35 and ring 36 forming a standard or support for the receptacle. The receptacle, as shown more clearly in Fig. 4, is provided with a ring flange 38 forming a seat for a rubber gasket 39 to be engaged by a threaded ring section 40 of the water jacket of the discharge device. The inner wall portion 12 of the jacket is supported by the outer wall 13 thereof by an annular perforated bridge or web section 41. The central inlet port of the jacket is provided with a tubular extension 42 which reaches beyond the end of the annular output port of the jacket and extends into the receptacle 37. The receptacle 37 is provided with an integral inwardly projecting tubular member 43 which is telescopically engaged by the extension 42 of the jacket when the jacket is applied to the receptacle in the mounting and the annular space around the tubular member 43 forms the outlet from the jacket to an outlet port 44 in the side of the receptacle below the metallic ring 36. When the threaded section 40 of the jacket is applied to the receptacle 38, a locking nut 45 securely fastens the two members together to provide a water-tight joint. The standard also supports an annular metallic bellows-type expansion chamber or sump 46 by bracket 47 and the chamber is mounted coaxially around the jacket of the discharge device to reduce the over-all length of the unit. In this arrangement the locking nut for the jacket and the receptacle is nested below the chamber. However, the nut is easily manipulated by a hand-wheel 48 surrounding the discharge device and provided with downwardly extending spokes secured to the nut 45, the wheel also acting as a corona shield. The outlet from the receptacle 37 is connected to the expansion chamber or sump by a short bent elbow connection or conduit 50 so that the high pressure fluid passing through the outlet chamber of the jacket and the receptacle is projected into the expansion chamber which is normally at atmospheric pressure to compensate for differences in pressure flow in the circulating fluid, the expansibility of the chamber taking care of the overflow of fluid passing through the system.

The impeller pump 34 is provided with a rotary shaft 51 connected to an insulating sleeve or tubular section 52 attached to the impeller shaft 53, the shafting extending through the bottom of the duct casing 31. The pump housing is also provided with an outlet port 54 and an inlet port 55 and the latter port is interconnected to the expansion chamber by a long conduit 56. The lower end of the duct casing is provided with four legs 57, which may be formed of insulating material, to facilitate the mounting of the unit in relation to other equipment and protects the pump shafting from injury or misalignment.

Figure 6:
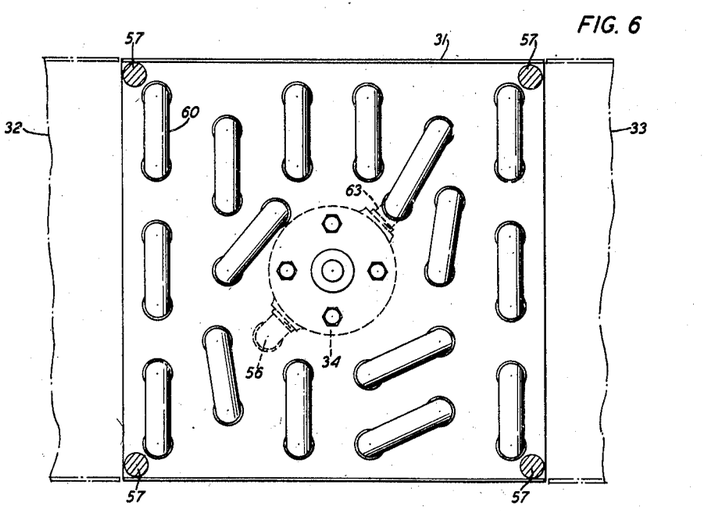
Fig. 6 is a bottom plan view of the radiator assembly taken on the line 6—6 of Fig. 2.
Figure 7:
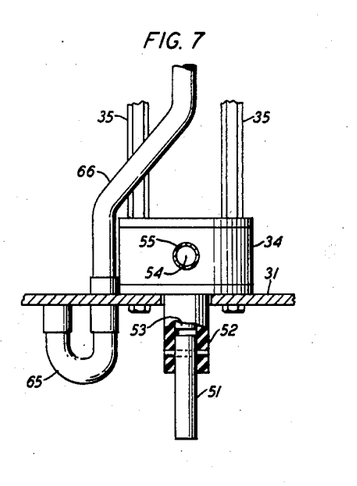
Fig. 7 is a partial detail view of the impeller pump assembly and the coupling therefor extending below the unit and taken on the line 7—7 of Fig. 2.
Figure 8:
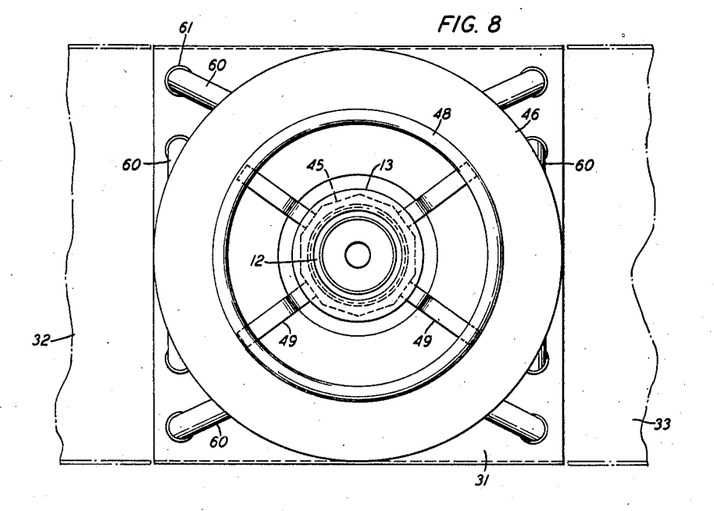
Fig. 8 is a top plan view of the assembly shown in Fig. 2 with the discharge device removed to clarify the arrangement.

The efficiency of the heat exchanger or radiator is materially increased in this construction by providing a plurality of upright sections 58 of tubes having peripheral porcupine fins 59 along the whole length of the tube and the upright tubes being interconnected by elbow joints 60 exterior to the casing at the top and bottom thereof so that the plurality of tubes form a continuous circulating passageway for the cooling fluid contained within the system which as heretofore described may be "Prestone." The capacity of the system is approximately one gallon. The radiator tubes are mounted within the casing 31 by having their ends brazed or soldered in tubular projections 61 and 62 formed on opposite ends of the casing in aligned relation and the elbow joints 60 are brazed to the tubular projections to connect pairs of adjacent tubes at the bottom of the casing, as shown in Fig. 6, the pairs of tubes at the top being interconnected by similar elbow connections to provide a continuous circulating path for the cooling fluid passing through the system.

Figure 5:
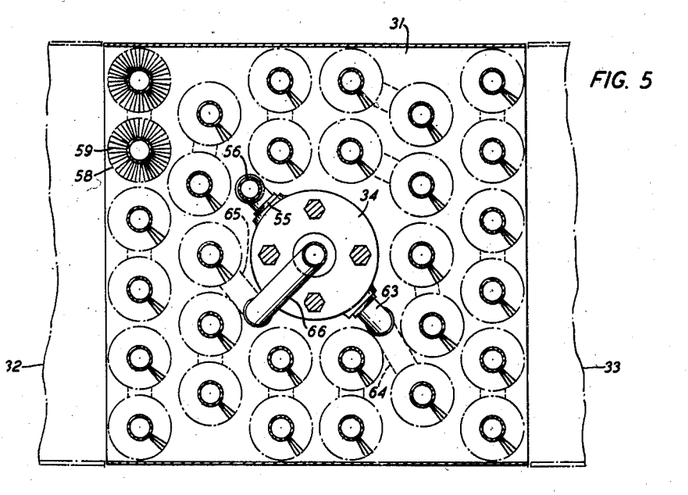
Fig. 5 is a top plan view of the radiator assembly taken on the line 5—5 of Fig. 2.

To clarify the progress of the cooling fluid through the radiator tube system, reference is made to Fig. 5 which shows the relationship of the various tube sections of the radiator with respect to the casing and the pump housing. Starting with the flow of the fluid from the expansion chamber 46, the fluid flows downwardly through the long conduit 56 at a reduced pressure due to the action of the impeller pump and enters the pump housing through the inlet port 55. The fluid is emitted from the outlet port 54 through an elbow connection 63 then through a U-shaped elbow 64, angularly directed with respect to the casing, to the first radiator tube positioned at the bottom of the second vertical row, lower right-hand corner, as viewed in Fig. 5. This tube is connected to the lower right-hand corner tube of the first row and the succeeding tubes in this row are serially connected by the elbows to permit the passage of the cooling fluid. The top right-hand tube is connected to the top tube in the second row by an upper elbow and this tube is connected to the adjacent tube in the top third row. It is then advanced to the top tube in the fourth row which is connected to its adjacent tube in the same row above the pump and this tube is connected to the second tube in the third row by an overhead connection. The system is then continued to the remaining three tubes in the second row, whereupon an overhead connection joins the lower pair of tubes in the third row to the continuity and the liquid is passed into the lower pair of tubes in the fourth row and then to the lower pair of tubes in the fifth row. The system is continued to the series of tubes in the sixth row beginning from the bottom to the top and this series of tubes is connected to the top pair of tubes in the fifth row and finally completes the circuit through the middle tube in the fifth row by an overhead connection. The outlet from the final tube is led through an angularly directed U-shaped connection 65 through the lower end of the casing. This connection is joined to a long tubular conduit 66 extending through the casing alongside of the pump housing and bent at an angle above the housing to direct the conduit toward the receptacle 37 where it forms a continuation of the tubular extension 43 within the receptacle.

The compact assembly and the high efficiency of the radiator within the duct casing eliminates extraneous auxiliary equipment heretofore necessary in transmitter installations, such as, long insulating water columns, special water supply, elaborate safety equipment and aerating spray pools exterior to the building in which the transmitter is housed. Furthermore, the self contained unit is easily portable and readily handled by one operator for installation or replacement without attendant difficulties of disconnecting the cooling supply of fluid or performing other operations which reduce the service time of the device. The closed system of the radiator and jacket is free from various hazards, such as low temperatures and supply cutoffs heretofore encountered in existing constructions and the maintenance thereof is reduced to a minimum. The only moving part liable to require attention is the impeller pump housing. Of course, any damage to the electron discharge device may be easily remedied by removing the defective device and the replacement with new device, this operation requiring a minimum of idle period in the operation of the unit.

While the invention has been disclosed with respect to certain specific embodiments of the invention, it is, of course, understood that various modifications may be made in the detailed assembly and construction of the self-contained unit without departing from the scope of the invention as defined in the appended claims.

What is claimed is:

1. In combination, an external anode electron discharge device, a jacket having inlet and outlet ports surrounding said device adjacent said anode, a duct casing in supporting relation to said device and said jacket, a radiator formed of a plurality of hollow sections within said casing, one end thereof being connected to said inlet port and the other end being mounted in communication with said outlet port, said radiator containing a cooling refrigerant, an impeller pump communicating with said radiator and said inlet port, and an expansion chamber between said radiator and said outlet port.

2. A self-contained unit comprising an electron discharge device having an external anode, an enclosing jacket about said anode having inlet and outlet ports, a closed circuitous heat exchanger connected to said inlet and outlet port and containing a cooling medium, an impeller pump associated with said heat exchanger for circulating said cooling medium through said jacket, and a duct casing adapted to form a passageway for a draft of forced air enclosing said heat exchanger and supporting said jacket.

3. A self-contained unit comprising an electron discharge device having an external anode, an enclosing jacket about said anode having inlet and outlet ports, a closed tubular heat exchanger connected to said inlet and outlet ports and containing a cooling medium, a rotary pump associated with said heat exchanger, and a duct casing enclosing said heat exchanger and supporting said device and jacket thereabove.

4. In combination, an external anode electron discharge device, a metallic jacket having inlet and outlet ports surrounding said device adjacent said anode, a duct casing in cooperating relation to said device and jacket, a radiator formed of a plurality of hollow sections within said casing, one end thereof being connected to said inlet port and the other end being mounted in communication with said outlet port, an impeller pump associated with said radiator and said inlet port, said radiator containing a cooling medium for recirculation through said jacket and radiator, and an expansion chamber surrounding said jacket and connected between said outlet port and one end of said radiator.

5. A self-contained unit comprising an electron discharge device having an external anode, an enclosing jacket about said anode having inlet and outlet ports, a closed tubular radiator connected to said inlet and outlet ports and containing a cooling medium, an impeller pump communicating with said radiator and said inlet port, an air duct casing enclosing said radiator, and a platform between said jacket and radiator forming a closure for said duct casing.

6. A self-contained unit comprising an electron discharge device having an external anode, an enclosing jacket about said anode having inlet and outlet ports, a closed tubular radiator connected to said inlet and outlet ports and containing a cooling medium, an impeller pump communicating with said radiator and said inlet port, an air duct casing enclosing said radiator, and means for removing said radiator, jacket and pump from said casing as a unit.

7. A self-contained cooling unit comprising an electron discharge device having an external anode, an enclosing jacket about said anode having inlet and outlet ports, a closed tubular radiator connected to said inlet and outlet ports and containing a cooling medium, an impeller pump communicating with said radiator and said inlet port, means for imparting rotary movement of said pump for circulating said cooling medium through the system, and insulated coupling means between said pump and said means for imparting rotary movement to said pump.

8. A self-contained cooling unit comprising an electron discharge device having an external anode, an enclosing jacket about said anode having inlet and outlet ports, a closed tubular radiator connected to said inlet and outlet ports and containing a cooling medium, a rotary pump communicating with said radiator and said inlet port, a duct casing enclosing said radiator, and means for insulating said duct casing from the high potential of said unit.

9. In combination, an external anode fluid-cooled discharge device, an enclosing jacket surrounding said anode, a tortuous tubular heat radiator having opposite ends connected to said jacket, said radiator containing a cooling fluid, a platform intermediate said jacket and radiator, a fluid pump between one end of said radiator and the inlet of said jacket, and supported on said platform, and an air-cooled duct having an opening to receive said radiator, said platform closing the opening of said duct.

10. A self-contained unitary assembly comprising an electron discharge device having an external anode portion, a cyclindrical cooling jacket surrounding said anode portion and having concentric inlet and outlet ports for the circulation of a cooling fluid, said inlet port having a tubular extension beyond said outlet port, an air duct casing having openings on opposite sides thereof, a central impeller pump mounted within said casing, a standard formed of a plurality of upright supports extending from said pump, a receptacle carried by said standard, means for removably connecting said jacket to said receptacle, a plurality of tubular radiator sections surrounding said standard within said casing, said radiator sections containing a recirculating cooling medium, and means for connecting one end of said radiator sections to said inlet port extension and the other end to said pump and said outlet port.

11. A self-contained unitary assembly comprising an electron discharge device having an external anode portion, a cylindrical cooling jacket surrounding said anode portion and having concentric inlet and outlet ports for the circulation of a cooling fluid, said inlet port having a tubular extension beyond said outlet port, an air duct casing having openings on opposite sides thereof, a central impeller pump mounted within said casing, a standard extending from said pump, a receptacle carried by said standard, means for removably connecting said jacket to said receptacle, a plurality of tubular radiator sections surrounding said standard within said casing, said radiator sections containing a circulating cooling medium, an annular expansion chamber surrounding said jacket and supported by said standard, means for connecting said radiator sections to said inlet port and said pump, and means for connecting said chamber to said outlet port and said pump.

12. A self-contained unitary assembly comprising an electron discharge device having an external anode portion, a cylindrical cooling jacket surrounding said anode portion and having concentric inlet and outlet ports for the circulation of a cooling medium, said inlet port having a tubular extension beyond said outlet port, an air duct casing having openings on opposite sides thereof, a central impeller pump mounted within said casing, a standard extending from said pump, a receptacle carried by said standard, means for removably connecting said jacket to said receptacle, a plurality of tubular radiator sections surrounding said standard within said casing, said radiator sections containing a circulating cooling medium, an annular expansion chamber mounted on said standard and surrounding said jacket, means for connecting said radiator sections to said inlet port extension and said pump, a tubular conduit connecting said receptacle to said expansion chamber, and an elongated tubular conduit connecting said pump to said chamber.

13. A self-contained unitary assembly comprising an electron discharge device having an external anode portion, a cooling jacket surrounding said anode portion and having concentric inlet and outlet ports for the circulation of a cooling fluid, an air duct casing having openings on opposite sides thereof for the passage of a forced draft of air, an impeller pump mounted centrally within said casing, a standard extending from said pump, a receptacle supported on said standard, a locking connection for removably separating said jacket and receptacle, a plurality of tubular radiator sections surrounding said standard within said casing, said sections containing a cooling medium, means for connecting one end of said radiator sections to said inlet port and the other end to said pump and said outlet port, an annular expansion chamber mounted on said standard and surrounding said jacket, and extension means projecting downwardly through the central opening of said expansion chamber for manipulating the locking connection between said receptacle and said jacket.

14. A self-contained unitary assembly comprising an electron discharge device having an external anode portion, a cooling jacket surrounding said anode portion and having inlet and outlet ports for the circulation of a cooling fluid, an air duct casing having side openings forming a passageway for a forced draft of air therethrough, an impeller pump mounted within said casing, a receptacle carried by said pump, means for removably connecting said jacket to said receptacle, a plurality of tubular radiator sections within said casing, said sections containing a circulating cooling medium, means for connecting one end of said radiator sections to said inlet port and the other end to said pump and outlet port, and an insulated drive shaft extending from the bottom of said casing and connected to said impeller pump.

15. A self-contained unitary assembly comprising an electron discharge device having an external anode portion, a cooling jacket surrounding said anode portion and having concentric inlet and outlet ports for the circulation of a cooling fluid, said inlet port having a tubular extension beyond said outlet port, an air duct casing having openings on opposite sides thereof, a central impeller pump mounted within said casing, a standard extending from said pump, a receptacle carried by said standard, means for removably connecting said jacket to said receptacle, a plurality of tubular radiator sections surrounding said standard in said casing, said sections containing a cooling medium, means for connecting said radiator sections to said pump and outlet port, and means for telescopically connecting said inlet port extension to a central radiator section within said receptacle.

16. A unitary cooling system comprising a rectangular duct casing having opposed open sides adapted to fit between adjacent similar duct sections for the passage therethrough of a forced draft of air, a plurality of vertical tubular radiator members extending through individual sleeve extensions on the top and bottom of said casing, elbow connections between adjacent pairs of said members exterior to the bottom of said casing, similar elbow connections joining the unconnected members exterior to the top of said casing to form a continuous path, a central pump housing supported in the lower end of said casing, one of said sections being connected to the inlet of said pump housing and another section being connected to the outlet of said pump housing, a standard supported by said pump housing, a receptacle carried by said standard and extending through said casing, an external anode discharge device having an integral metallic jacket mounted in relation to said receptacle, a coupling nut joining said jacket to said receptacle, said nut being nested centrally in a cavity surrounded by said elbow connections and an extension handwheel surrounding said device being connected to said coupling nut for locking said jacket to said receptacle.

17. A unitary cooling system comprising a rectangular duct casing having opposed open sides adapted to fit between adjacent similar duct sections for the passage therethrough of a forced draft of air, a plurality of vertical tubular radiator sections extending through said casing, elbow connections between pairs of said sections exterior to the bottom of said casing, similar elbow connections between the unconnected sections exterior to the top of said casing, a central pump housing supported in said casing, one of said sections being connected to the inlet of said pump housing and another section being connected to the outlet of said pump housing, a standard supported by said pump housing, a receptacle carried by said standard and extending through said casing, an external anode discharge device having an integral metallic jacket mounted in relation to said receptacle, a coupling nut joining said jacket to said receptacle, an annular bellows-type metallic expansion chamber surrounding said jacket and being supported on said standard above said casing, a short conduit connected between one side of said chamber and said receptacle, an elongated conduit connected between the other side of said chamber and said pump housing, and a recirculating cooling fluid contained in said radiator sections, jacket and chamber.

18. A unitary cooling system, comprising a duct casing having opposed open sides adapted to fit between adjacent similar duct sections for the passage therethrough of a forced draft of air, a plurality of vertical fin-type radiator tubes extending through opposite ends of said casing, elbow connections between pairs of said tubes exterior to the bottom of said casing, similar elbow connections between the unconnected tubes exterior to the top of said casing, a central pump housing in the lower end of said casing, a standard supported by said pump housing, a receptacle carried by said standard and extending through the top of said casing, an external anode discharge device having an integral metallic jacket mounted in relation to said receptacle, said jacket and radiator tubes containing a cooling fluid, one of said tubes being bent around said pump housing to centrally align the inlet passageway with respect to said receptacle which is coaxial with said housing, a tubular extension in said jacket telescopically engaging the inlet tube within said receptacle, an annular expansion chamber surrounding said jacket, said receptacle having a peripheral opening communicating with said expansion chamber, another of said tubes being connected between said chamber and said pump housing, and brackets supporting said chamber coaxial with said device and said jacket from said standard.

JOHN B. LITTLE.
VICTOR L. RONCI.